(12) United States Patent
Hamada

(10) Patent No.: US 8,797,449 B2
(45) Date of Patent: Aug. 5, 2014

(54) AUTO-FOCUSING APPARATUS

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 13/308,722

(22) Filed: Dec. 1, 2011

(65) Prior Publication Data
US 2012/0236198 A1 Sep. 20, 2012

(30) Foreign Application Priority Data
Mar. 18, 2011 (KR) .................. 10-2011-0024343

(51) Int. Cl.
H04N 5/232 (2006.01)

(52) U.S. Cl.
USPC .......................................... 348/349

(58) Field of Classification Search
USPC .......... 348/345, 349, 351, 352, 353, 354, 356
See application file for complete search history.

(56) References Cited

U.S. PATENT DOCUMENTS

| 5,379,088 | A | * | 1/1995 | Ueda et al. ............... 396/49 |
| 5,739,857 | A | * | 4/1998 | Kaneda .................. 348/349 |
| 7,634,185 | B2 | * | 12/2009 | Terayama et al. ......... 396/95 |
| 2005/0012846 | A1 | * | 1/2005 | Shinohara ............... 348/345 |
| 2009/0135291 | A1 | * | 5/2009 | Sugimoto ............... 348/347 |
| 2010/0277639 | A1 | * | 11/2010 | Karasawa ............... 348/345 |
| 2011/0050982 | A1 | * | 3/2011 | Katsuyama et al. ....... 348/345 |
| 2012/0182462 | A1 | * | 7/2012 | Hamada ................. 348/352 |

FOREIGN PATENT DOCUMENTS

| JP | 2005-321489 A | 11/2005 |
| JP | 2006-011068 A | 1/2006 |
| JP | 2010-008695 A | 1/2010 |
| JP | 2010-107711 A | 5/2010 |
| JP | 2010-169882 A | 8/2010 |

* cited by examiner

Primary Examiner — Timothy J Henn
(74) Attorney, Agent, or Firm — Drinker Biddle & Reath LLP

(57) ABSTRACT

An auto-focusing apparatus detects a speed of a moving object accurately even in a system in which backlash exists in focusing control by performing moving object prediction auto-focusing (AF).

14 Claims, 17 Drawing Sheets

AUTO-FOCUSING APPARATUS

CROSS-REFERENCE TO RELATED PATENT APPLICATIONS

This application claims the priority benefit of Korean Patent Application No. 10-2011-0024343, filed on Mar. 18, 2011, in the Korean Intellectual Property Office, the disclosure of which is incorporated herein in its entirety by reference.

BACKGROUND

1. Field

One or more embodiments relate to an auto-focusing apparatus.

2. Description of the Related Art

In single-lens reflex camera systems according to the related art, moving object prediction Automatic Focusing (AF) is performed using a phase difference AF module so as to focus on a subject that moves in a direction of an optical axis of a camera. However, in contrast AF type cameras using an imaging device, a peak of focus evaluation values is detected, and a target position of a focus lens corresponding to the peak is detected. Thus, the target position of the focus lens cannot be obtained before detecting the peak of the focus evaluation values, and it takes time to detect the peak of the focus evaluation values. Thus, it is not easy to focus on a moving object.

SUMMARY

One or more embodiments provide an auto-focusing apparatus that may detect a speed of a moving object even in a system in which backlash exists in focusing control.

According to an embodiment, an auto-focusing apparatus includes: a focus lens; a driving unit that drives the focus lens; an imaging device that receives an optical signal that has passed through the focus lens and generates an image signal; a focus evaluation value calculating unit that calculates focus evaluation values related to a focus state from the image signal; a peak position detecting unit that detects a target position of the focus lens corresponding to a peak of the focus evaluation values; and an operation unit that performs a prediction operation with respect to a moving object by using the peak position obtained by the focus lens in only a first direction.

A moving object prediction position may be calculated by using a result of the prediction operation with respect to the moving object, and the focus lens may be controlled to the moving object prediction position when the focus lens is driven in the first direction by performing focusing control by driving the focus lens.

The driving unit may drive the focus lens in the first direction and a second direction opposite to the first direction.

The first direction may be a direction in which an error due to backlash is compensated for.

The driving unit may drive the focus lens in the first direction and a second direction opposite to the first direction, and the peak position detecting unit may detect a peak position in which backlash is compensated for by driving the focus lens in the first direction and the second direction.

The operation unit may calculate a speed of the moving object by using a first peak position in the first direction and a second peak position in the first direction, and a time difference between the first peak position and the second peak position.

The operation unit may calculate a speed of the moving object by using a first peak position in the first direction and a time corresponding to the first peak position, a second peak position in the first direction and a time corresponding to the second peak position, and a third peak position in the first direction and a time corresponding to the third peak position.

Moving object prediction auto-focusing (AF) may be performed by calculating an in-focus position from a speed of the moving object and a time up to an exposure time.

The focus evaluation value calculating unit may calculate focus detection evaluation values at least once by driving the focus lens by a predetermined amount during a period of a signal 1VD in the first direction and may calculate focus detection evaluation values at least once by driving the focus lens by a predetermined amount during a period of the signal 1VD in a direction opposite to the first direction.

The predetermined amount may be a defocus amount that is greater than a focus depth.

The focus evaluation value calculating unit may calculate focus detection evaluation values by driving the focus lens by a minor amount during a period of a signal 1VD in the first direction and may calculate focus detection evaluation values by driving the focus lens by a minor amount during a period of the signal 1VD in a direction opposite to the first direction.

The minor amount may be a defocus amount that corresponds to a focus depth.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments are shown.

Figure 1:
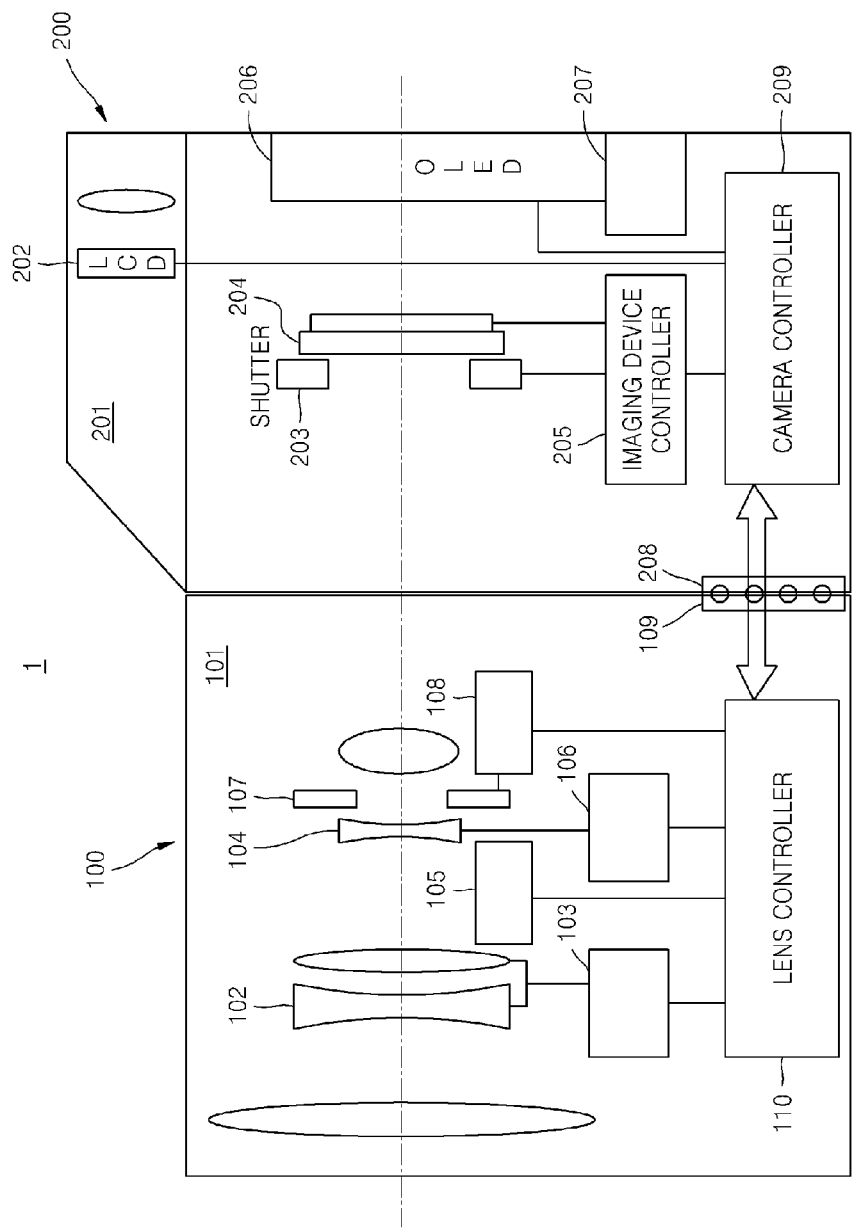
FIG. 1 illustrates an auto-focusing apparatus of a digital photographing device, according to an embodiment.

FIG. 1 illustrates an auto-focusing apparatus of a digital photographing device 1, according to an embodiment.

Referring to FIG. 1, the digital photographing device 1 according to the current embodiment includes an exchangeable lens 100 and a main body unit 200. The exchangeable lens 100 has a focus-detecting function, and the main body unit 200 has a function of controlling the exchangeable lens 100 to drive a focus lens 104.

The exchangeable lens 100 (hereinafter referred to as a 'lens') includes an imaging optical system 101, a zoom lens position detecting sensor 103, a lens driving unit 105, a focus lens position detecting sensor 106, a diaphragm driving unit 108, a lens controller 110, and a lens mount 109.

The imaging optical system 101 includes a zoom lens 102 for controlling zoom magnification, the focus lens 104 for changing a focus position, and a diaphragm 107. The zoom lens 102 and the focus lens 104 may each include a lens group including a plurality of lenses.

The zoom lens position detecting sensor 103 and the focus lens position detecting sensor 106 respectively detect a position of the zoom lens 102 and a position of the focus lens 104. A time at which the position of the focus lens 104 is detected may be set by using the lens controller 110 or a camera controller 209 as described below. For example, the time at which the position of the focus lens 104 is detected may be a time at which a focus is detected from an image signal.

The lens driving unit 105 and the diaphragm driving unit 108 are controlled by the lens controller 110 and drive the focus lens 104 and the diaphragm 107, respectively. In particular, the lens driving unit 105 drives the focus lens 104 in a direction of an optical axis.

The lens controller 110 transmits information regarding the detected position of the focus lens 104 to the main body unit 200. In this regard, when there is a change in the position of the focus lens 104 or when there is a request for the information regarding the detected position of the focus lens 104 from the camera controller 209, the lens controller 110 may transmit the information regarding the detected position of the focus lens 104 to the main body unit 200.

The lens mount 109 includes lens-side communication pins that are engaged with camera-side communications pins as described below. The lens mount 109 is used as a transmission path for data, a control signal, or the like.

Next, a description of a configuration of the main body unit 200 is provided.

The main body unit 200 may include a viewfinder 201, a shutter 203, an imaging device 204, an imaging device controller 205, a display unit 206, a manipulation unit 207, the camera controller 209, and a camera mount 208.

The viewfinder 201 includes a liquid crystal display unit 202. The viewfinder 201 may allow an image to be captured to be checked in real-time.

The shutter 203 determines a time during which light is irradiated onto the imaging device 204, i.e., an exposure time.

The imaging device 204 receives an optical signal that has been transmitted through the imaging optical system 101 of the lens 100, thereby generating an image signal. The imaging device 204 may include a plurality of photoelectric converters arranged in a form of a matrix, and a horizontal transmission path by which charges are moved from the plurality of photoelectric converters and the image signal is read, or the like.

The imaging device controller 205 generates a timing signal and controls the imaging device 204 to capture an image in synchronization with the timing signal. Also, the imaging device controller 205 reads the image signal if charge accumulation on each of the scan lines is completed. The read image signal is used to detect a focus of the image signal by using the camera controller 209.

Various types of images and information are displayed on the display unit 206. The display unit 206 may be an organic light-emitting diode (OLED) display apparatus, a liquid crystal display (LCD) apparatus, or the like.

The manipulation unit 207 inputs various types of commands from a user to manipulate the digital photographing device 1. The manipulation unit 207 may include various types of buttons such as a shutter release button, a main switch (MS), a mode dial, a menu button, and the like.

The camera controller 209 detects the focus of the image signal generated by the imaging device 204 so as to calculate focus evaluation values. Also, the camera controller 209 calculates and stores the focus evaluation values every time the focus of the image signal is detected according to the timing signal generated by the imaging device controller 205 and calculates a target position of the focus lens 104 from the information regarding the detected position of the focus lens 104 transmitted from the lens 100 and the stored focus evaluation values. A result of the calculated target position of the focus lens 104 is transmitted to the lens 100.

The camera mount 208 includes the camera-side communication pins.

Hereinafter, operations of the lens 100 and the main body unit 200 will be described.

When a subject is photographed, the MS of the manipulation unit 207 is manipulated to start an operation of the digital photographing device 1. The digital photographing device 1 displays a live view as follows.

An optical signal from the subject is transmitted through the imaging optical system 101 and then incident on the imaging device 204. In this case, the shutter 203 is in an open state. The optical signal from the subject is converted into an electrical signal by the imaging device 204, and an image signal is generated from the electrical signal. The imaging device 204 operates in response to a timing signal generated by the imaging device controller 205. The image signal corresponding to the subject is transformed into displayable data by the camera controller 209 and is output to the viewfinder 201 and the display unit 206. The current operation is a live view display, in which a live view image displayed by a live view is continuously displayed as a moving image.

After the live view image is displayed, if the shutter release button of the manipulation unit 207 is half-pressed, the digital photographing device 1 starts an Automatic Focusing (AF) operation. The AF operation is performed using the image signal generated by the imaging device 204. A target position of the focus lens 104 is calculated from focus evaluation values related to contrast values by using a contrast AF method, and the lens 100 is driven based on a result of the calculation. The focus evaluation values are calculated by the camera controller 209. The camera controller 209 calculates information about controlling of the focus lens 104 from the focus evaluation values and transmits the information via the communication pins included in the lens mount 109 and the communication pins included in the camera mount 208 to the lens controller 110.

The lens controller 110 controls the lens driving unit 105 based on the received information and drives the focus lens 104 in a direction of the optical axis, thereby performing the AF operation. A position of the focus lens 104 is monitored by the focus lens position detecting sensor 106 and a result of the monitoring is fed back to the camera controller 209.

When the zoom lens 102 is manipulated and zoomed by the user, a position of the zoom lens 102 is detected by the zoom lens position detecting sensor 103, and the lens controller 110 changes AF control parameters regarding the focus lens 104 so as to perform the AF operation again.

When an image obtained from the subject is in an in-focus state by performing the operation described above, the digital photographing device 1 performs an exposure operation when the shutter release button (S2) is fully pressed. In this regard, the camera controller 209 first closes the shutter 203 fully and transmits light measurement information to the lens controller 110 as diaphragm control information. The lens controller 110 controls the diaphragm driving unit 108 based on the diaphragm control information, and the diaphragm driving unit 108 drives the diaphragm 107 to have a properly-tightened value. The camera controller 209 controls the shutter 203 based on the light measurement information to open at a proper exposure time so that a photographing operation is performed and the image of the subject is captured.

Figure 3:
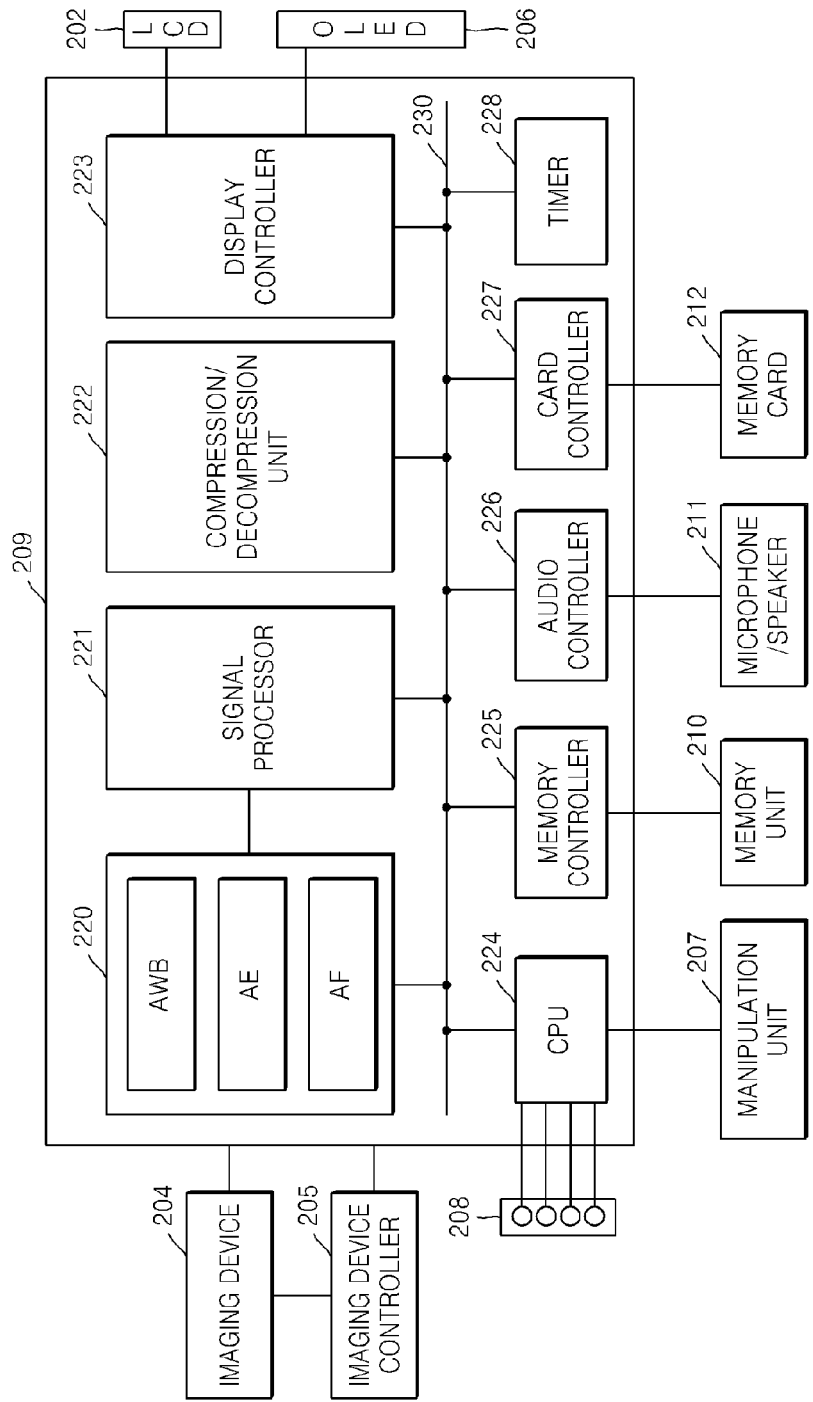
FIG. 3 illustrates a block diagram of a camera controller of the digital photographing device illustrated in FIG. 1, according to an embodiment.

Image signal processing and compression are performed on the captured image, and the captured image is stored in a memory card 212 of FIG. 3. The captured image is output to the viewfinder 201 and the display unit 206 to display the subject. The displayed image is referred to as a quick view image.

A series of photographing operations are completed by the above-described process.

Figure 2:
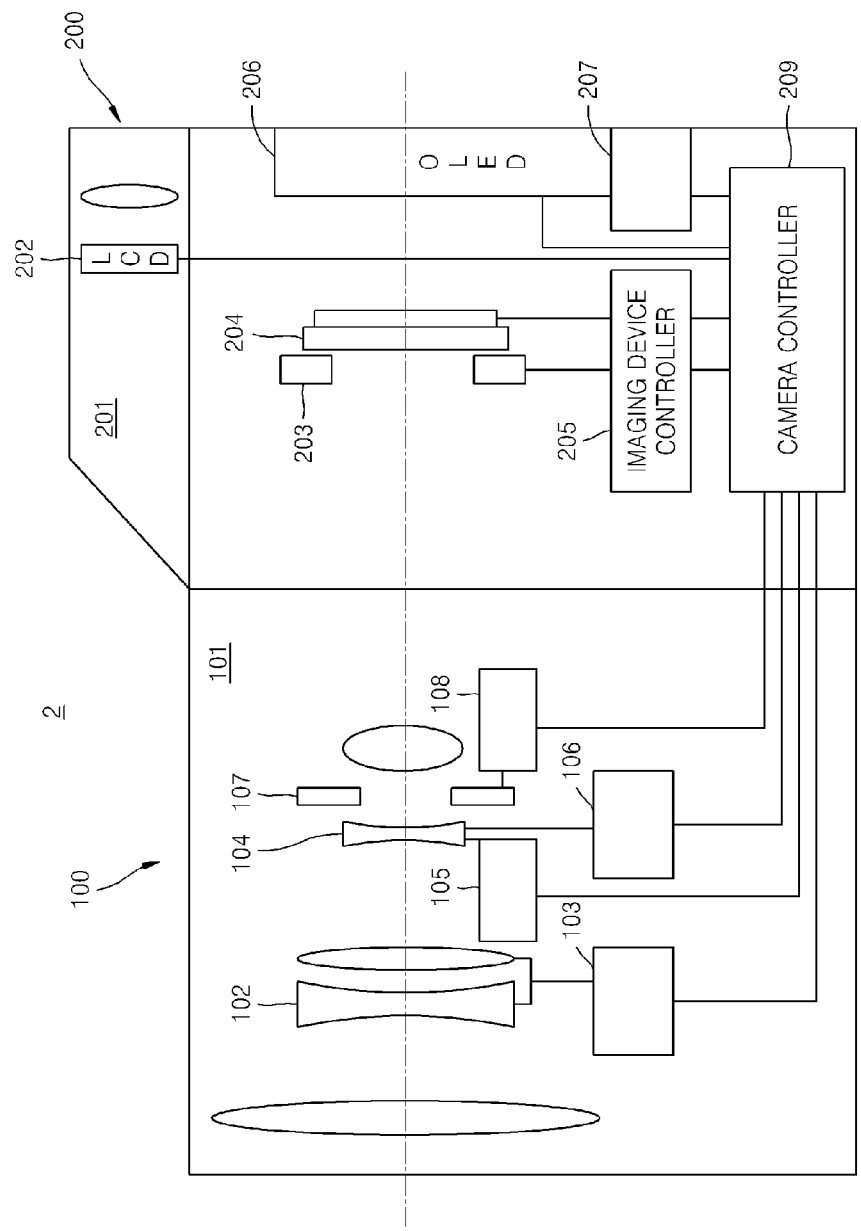
FIG. 2 illustrates an auto-focusing apparatus of a digital photographing device, according to another embodiment.

FIG. 2 illustrates an auto-focusing apparatus of a digital photographing device 2, according to another embodiment.

Referring to FIG. 2, the digital photographing device 2 according to the current embodiment has a configuration and function similar to those of the digital photographing device 1 illustrated in FIG. 1, and thus, only differences therebetween will be described. In the digital photographing device 2, the lens 100 and the main body unit 200 are integrally formed. Thus, the lens 100 cannot be exchanged with another lens. Also, since the lens 100 and the main body unit 200 are integrally formed, there are no lens mount 109 and no camera mount 208 in the digital photographing device 2. Thus, the camera controller 209 directly controls the lens driving unit 105, the diaphragm driving unit 108, and the like. Also, the camera controller 209 may receive position information from the zoom lens position detecting sensor 103 and the focus lens position detecting sensor 106.

FIG. 3 illustrates a block diagram of the camera controller 209 of the digital photographing device 1 illustrated in FIG. 1, according to an embodiment.

Referring to FIG. 3, the camera controller 209 according to the current embodiment may include a pre-processor 220, a signal processor 221, a compression/decompression unit 222, a display controller 223, a central processing unit (CPU) 224, a memory controller 225, an audio controller 226, a card controller 227, a timer 228, a main bus 230, and the like.

The camera controller 209 transmits various types of instructions and data to each of the above-described elements of the digital photographing device 1 via the main bus 230.

The pre-processor 220 receives an image signal generated by the imaging device 204 and performs an operation for calculating evaluation values so as to perform Automatic White Balance (AWB), Automatic Exposure (AE), and AF. In detail, the pre-processor 220 includes a focus evaluation value calculating unit AF for calculating focus evaluation values related to a focus state from the image signal generated by the imaging device 204. The pre-processor 220 further includes a white balance evaluation value calculating unit AWB for calculating evaluation values for white balance control, and an exposure evaluation value calculating unit AE for calculating evaluation values for exposure control.

The signal processor 221 performs a series of image processing such as gamma correction and the like, thereby generating a live view image or a captured image displayable on the display unit 206.

The compression/decompression unit 222 compresses the image signal via JPEG or H.264 compression. An image file including image data generated by the compression is transmitted to the memory card 212 and is stored therein.

The display controller 223 controls image output on a display screen such as the LCD unit 202 or the display unit 206 of the viewfinder 201.

The CPU 224 controls all operations of the camera controller 209. Also, in the digital photographing device 1 of FIG. 1, the CPU 224 performs communication with the lens controller 110 via the camera mount 208.

The memory controller 225 controls a memory unit 210 for temporarily storing the captured image or data such as associative information. The audio controller 226 controls a microphone/speaker 211. Also, the card controller 227 controls the memory card 212 for storing the captured image. The timer 228 measures time.

FIGS. 4, 5, 6, and 7 illustrate graphs for explaining a contrast AF operation, according to an embodiment. In FIGS. 4 through 7, a horizontal axis represents a lens position of a focus lens, and a vertical axis represents focus evaluation values.

Focus evaluation values are calculated from an image signal. The focus evaluation values are sequentially calculated according to a position of a focus lens, thereby determining a target position of the focus lens corresponding to a peak of the focus evaluation values. The focus evaluation values are information about contrast of the image signal at which a subject is photographed, and the target position of the focus lens corresponding to the peak of the focus evaluation values may be determined as a position of the focus lens in an in-focus state.

Figure 4:
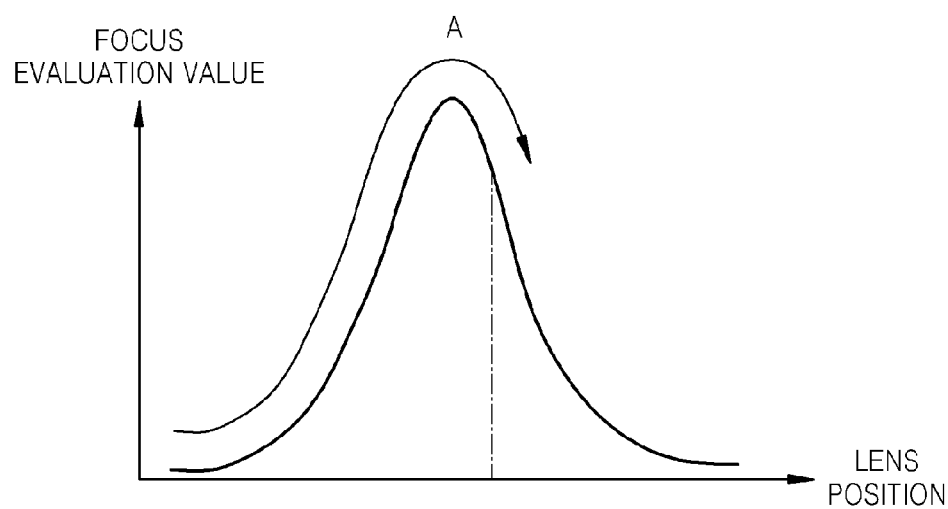
FIGS. 4, 5, 6, and 7 illustrate graphs for explaining a contrast Automatic Focusing (AF) operation, according to an embodiment.
Figure 5:
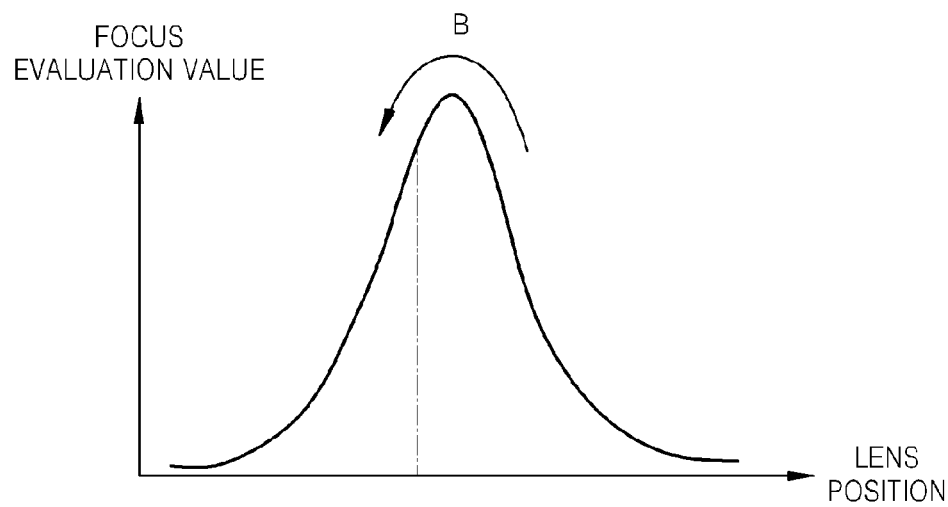
Figure 6:
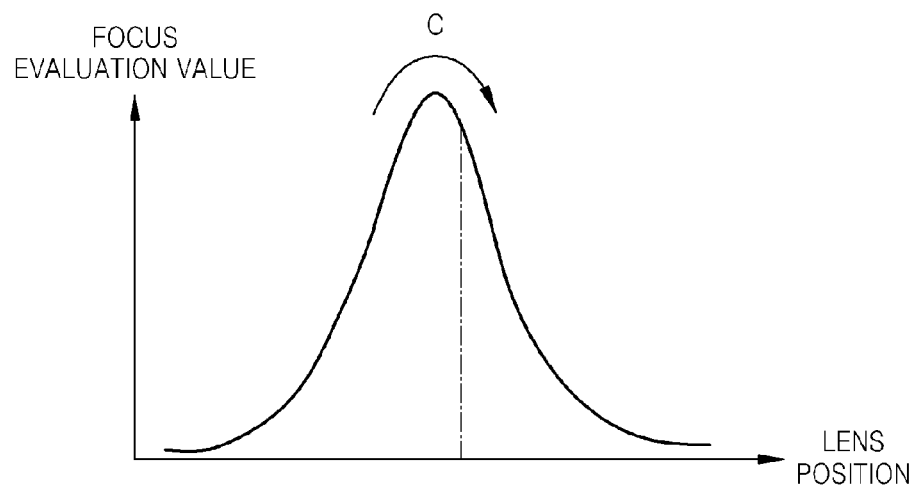
Figure 7:
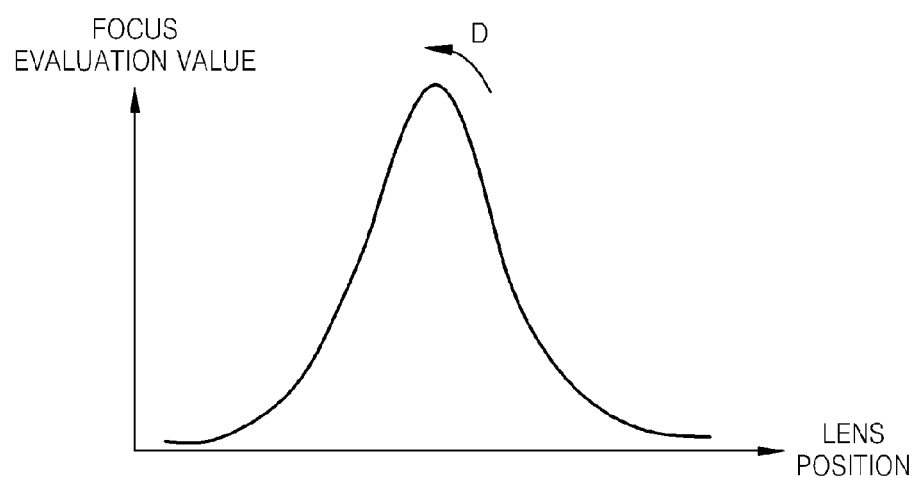

Referring to FIG. 4, the focus lens is scanned at a high speed in a second direction so as to detect the peak of the focus evaluation values. The scanning operation is an operation of calculating the focus evaluation values by operating the focus lens. This is referred to as "A-driving". A peak of the focus evaluation values is detected. As illustrated in FIG. 5, if the peak of the focus evaluation values is exceeded, the focus lens is driven at a lower speed in a first direction different from or opposite to the second direction of FIG. 4, thereby more precisely detecting the peak of the focus evaluation values. This is referred to as "B-driving". A position of the focus lens corresponding to the peak detected in FIG. 5 may be determined as a target position. As illustrated in FIG. 6, a scanning operation is performed in a direction different from that of FIG. 5, e.g., the second direction, which is the same as that of FIG. 4. This is referred to as "C-driving". For backlash compensation, i.e., in order to move the focus lens to the target position of the focus lens in the first direction, that is, the direction in which the focus lens is to be driven to its target position, the scanning operation is performed once more in the second direction as shown in FIG. 6. The scanning operation in FIG. 6 may not be a scanning operation for calculating the focus evaluation values but may be a scanning operation for focus lens driving. However, this should not be construed as limiting. In order to use the scanning operation in detecting a moving object, the scanning operation of calculating the focus evaluation values may be performed in FIG. 6. Referring to FIG. 7, the focus lens is moved to the target position so as to finally drive the focus lens in the same direction as that of FIG. 5, corresponding to an operation of finally moving the focus lens to the target position, i.e., moving the focus lens in the first direction. Thus, backlash may be compensated for. This is referred to as "D-driving".

Figure 8:
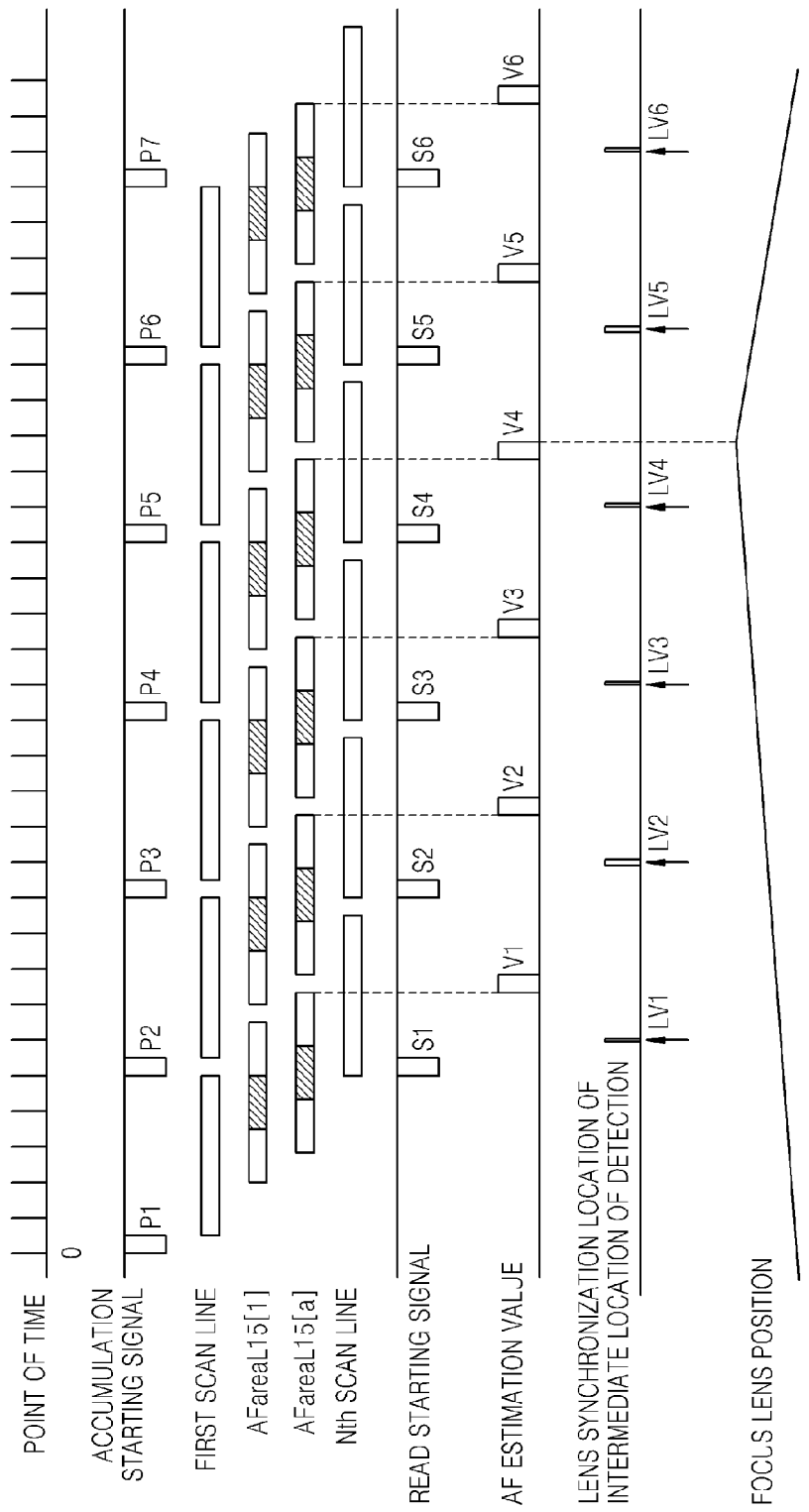
FIG. 8 illustrates a relationship between times at which focus evaluation values are calculated and a position of a focus lens.

FIG. 8 illustrates a relationship between times at which focus evaluation values are calculated and a position of a focus lens.

From the description above, FIG. 8 illustrates a time scale (POINT OF TIME), an image signal output time (ACCUMULATION STARTING SIGNAL), a scan line of an uppermost portion of a screen (FIRST SCAN LINE), a scan line of an uppermost portion of a focus detecting area (AFareaL15[1]), a scan line of a lowermost portion of the focus detecting area (AFareaL15[a]), a scan line of a lowermost portion of the screen (Nth SCAN LINE), an image information reading time (READ STARTING SIGNAL), a focus evaluation value calculating time (AF ESTIMATION VALUE), a focus detecting time corresponding to a central position of an image (LENS SYNCHRONIZATION LOCATION), and a focus lens position. In this regard, if a fourth focus evaluation value V4 is calculated and it is determined that the fourth focus evaluation value V4 is smaller than current focus evaluation values, a current time corresponds to a point of time at which it is determined that a peak of the focus evaluation values has been exceeded. Thus, a focus lens is driven in a reverse direction from a position of the focus lens corresponding to the fourth focus evaluation value V4. Thus, it may be determined that a target position of the focus lens is near a position of the focus lens at which a third focus evaluation value V3 is calculated. That is, it may be determined that a position of the focus lens corresponding to the peak of the focus evaluation values is near LV3. If the focus evaluation values calculated after the peak of the focus evaluation values is exceeded are smaller than the peak, reverse driving is performed. In this regard, in reverse driving after the fourth focus evaluation value V4, the focus lens is driven at a constant speed that is lower than a previous speed so as to precisely detect the target position of the focus lens. The operations correspond to those of FIGS. 4 and 5 described above. Although not shown, reverse driving as shown in FIG. 6 is performed.

Figure 9:
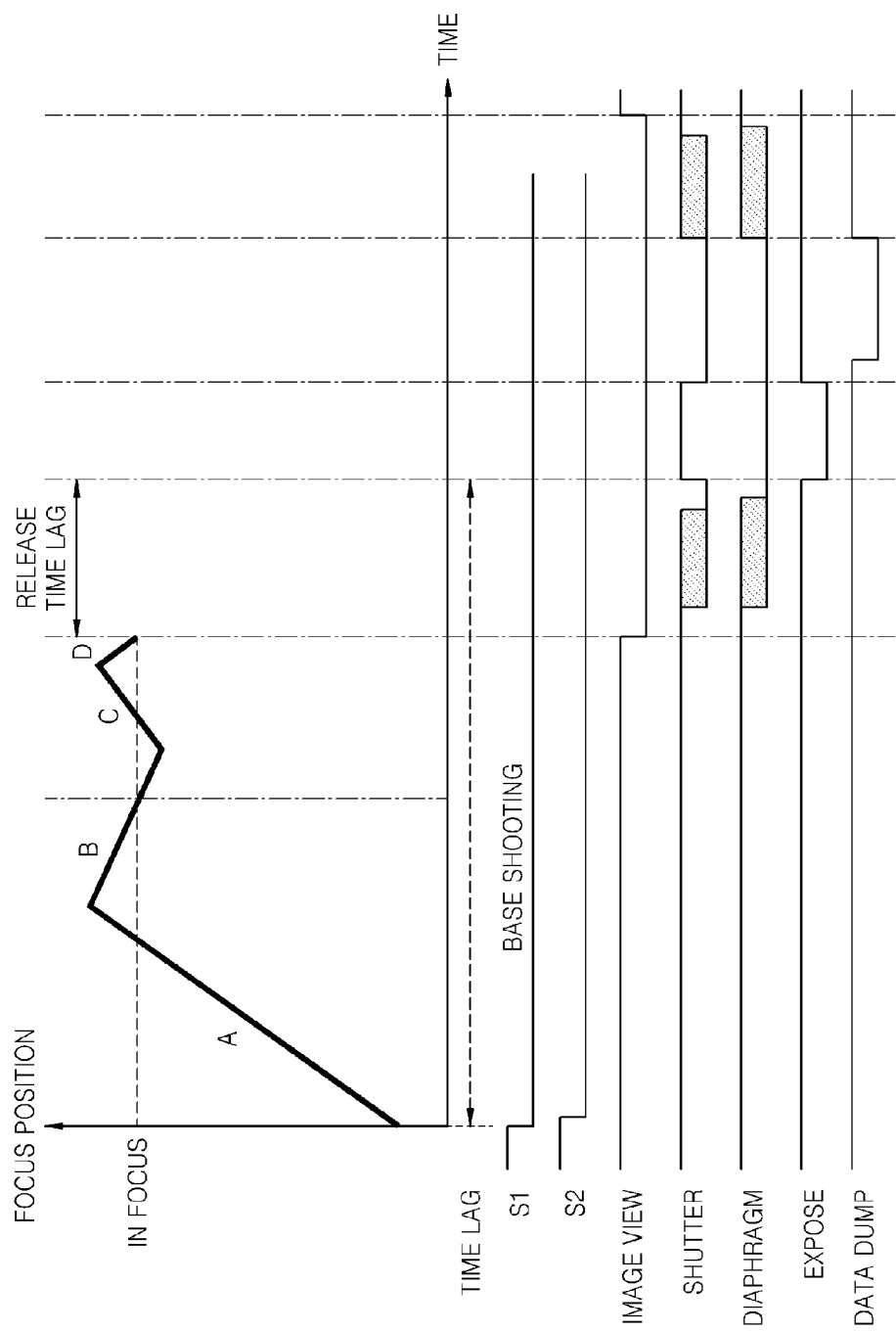
FIG. 9 illustrates a timing diagram of a relationship between time and a position of a focus lens.

FIG. 9 illustrates a timing diagram of a relationship between time and a position of a focus lens. Referring to FIG. 9, a horizontal axis represents time and a vertical axis represents a focus lens position. Sequentially, the timing diagram represents operation S1 performed by half-pressing a shutter release button, operation S2 performed by fully pressing the shutter release button, an image view signal for displaying a captured image, a shutter signal, a diaphragm signal, an exposure signal for using an imaging sensor, and an exposure image read signal (data dump).

FIG. 9 illustrates a time at which operation S1 and operation S2 are simultaneously performed. When operation S1 is performed and an AF operation starts, a focus lens is driven in a second direction at a constant, relatively high speed. This is A-driving illustrated in FIG. 4. If a peak of focus evaluation values is exceeded, the focus lens is driven at a constant, relatively low speed in a first direction opposite to the second direction. This is B-driving corresponding to FIG. 5. Here, a target position of the focus lens corresponding to the peak of the focus evaluation values is calculated. The focus lens is driven in the second direction again. This is C-driving corresponding to FIG. 6. Last, the focus lens is driven in the first direction for backlash compensation. This is D-driving corresponding to FIG. 7. The focus lens is driven to the target position, thereby completing the AF operation. A display of a live view image is erased, and a shutter is first closed. Simultaneously, a diaphragm in an open state is tightened until the diaphragm is properly tightened. At least one selected from the group consisting of the operation of erasing the display of the live view image, the operation of firstly closing the shutter, and the operation of properly tightening the diaphragm may be included in an exposure preparation operation. When the exposure preparation operation is completed, the shutter is opened. A time lag from a time at which the focus lens is moved to the target position and is in an in-focus state to a time at which the exposure preparation operation is completed is referred to as a release time lag. Also, the release time lag may also be, when operation S2 is performed after the focus lens is moved to the target position and is in the in-focus state, a time taken for the shutter to open after operation S2 is performed.

When the shutter is opened, an imaging device starts exposure, and when proper exposure is completed, the shutter is closed again. Then, information accumulated on the imaging device is read. After the information is read, the shutter is opened again, and the diaphragm is opened. However, when the subject moves in a direction of an optical axis of the focus lens, there is a time lag from a time at which the target position of the focus lens for an in-focus operation is detected to a time at which the focus lens is finally moved to the target position and is in the in-focus state, as illustrated in FIG. 9. The subject may even move during the time lag. Also, the subject may even move during the release time lag. Thus, a focus deviation between a focus when the focus lens is in the position corresponding to the in-focus state and a focus during an actual exposure may occur. In an embodiment as described herein, the focus deviation is corrected. Since a focus position of a moving object is predicted in the AF operation, the AF operation is referred to as a moving object prediction AF operation.

Figure 10:
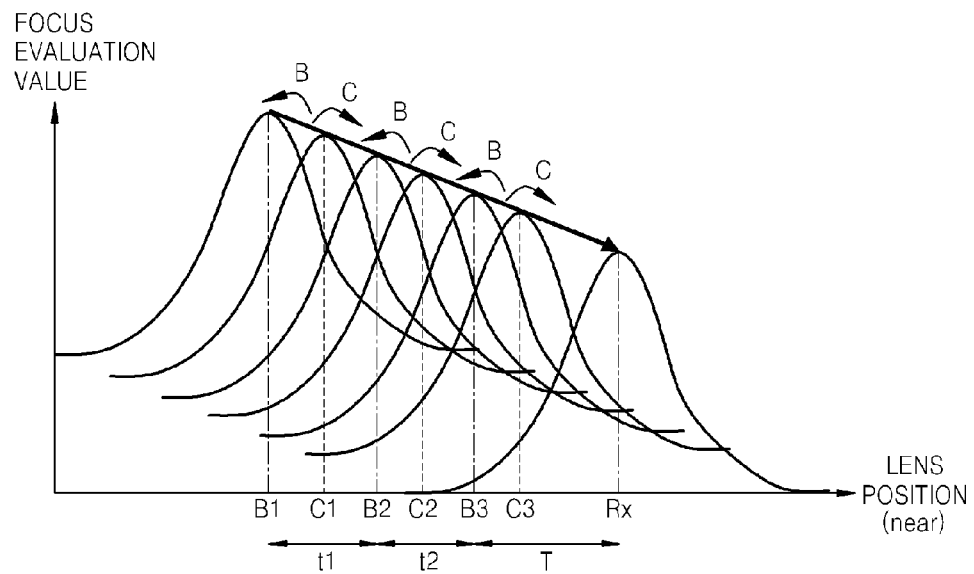
FIG. 10 illustrates a graph for explaining an operation of detecting a moving object by using contrast AF, according to an embodiment.

FIG. 10 illustrates a graph for explaining an operation of detecting a moving object by using contrast AF, according to an embodiment. A horizontal axis represents a focus lens position, in which a right side represents a near direction, and a vertical axis represents AF evaluation values. FIG. 10 illustrates a distribution of AF evaluation values when a subject is a moving object. When AF starts, A-driving of FIG. 4 is performed and then B-driving is performed. An initial position of a peak of AF evaluation values is obtained by performing B-driving. The initial peak position is referred to as B1. Then, C-driving of FIG. 6 is performed, and even in this case, focus detection evaluation values are calculated. A position of a peak of the focus detection evaluation values is detected and is a position in which an amount of backlash is compensated for. When a subject is a still subject, the peak position is nearly the same as B1, and when a subject is a moving object, the peak position is moved to C1. Since B1≠C1+BKL (backlash amount), the subject may be determined as a moving object. A peak of AF evaluation values is detected by performing B-driving again without performing D-driving of FIG. 7. In other words, it is determined that the subject is a moving object and the peak position is moved to B2. When the subject is a moving object, a speed of a face of the subject is calculated. When the subject moves at a comparatively low speed, the speed of the face of the subject may be approximated as a constant speed. Here, the speed is calculated based on a change between peak positions B1 and B2 and a time difference t1 between the peak positions B1 and B2. A speed Sv of the face of the subject may be calculated by using the following Equation 1.

$$Sv=(B1-B2)/t1 \qquad \text{[Equation 1]}$$

When a time difference t2 up to a point of time at which following focus detection evaluation values are obtained is used, an amount of correction ΔB3 for a moving object may be calculated by using the following Equation 2.

$$\Delta B3 = Sv \cdot t2 \qquad \text{[Equation 2]}$$

Where, during a release time, a correction value Δ R of a release time lag T may be calculated by using the following Equation 3.

$$\Delta R = Sv \cdot T \quad \text{[Equation 3]}$$

A peak position Rx at a release time may be calculated in order to perform the moving object prediction AF operation of driving a focus lens to the peak position Rx.

Here, the peak positions B1 and B2 are used to calculate the speed Sv in order to not include an error due to backlash in the calculation by using only information obtained in a direction in which backlash is compensated for. When it is determined that the focus lens is a lens having no backlash due to reverse-driving, the speed Sv may also be calculated by using the following Equation 4.

$$Sv = (B1 - C1)/t1 \quad \text{[Equation 4]}$$

In addition, when the speed Sv is calculated by using the peak positions B1 and B2, there is a difference in the focus detection evaluation values due to noise. Thus, the focus evaluation values may be averaged by including calculation of a peak position B3. In other words, in this regard, Sv1, Sv2, and Sv may be calculated by using the following Equations 5 and 6.

$$Sv1 = (B1 - B2)/t1$$

$$Sv2 = (B2 - B3)/t2 \quad \text{[Equation 5]}$$

$$Sv = (Sv1 + Sv2)/2 \quad \text{[Equation 6]}$$

A correction value Δ B4 during the AF operation and a correction value Δ R at a release time may be calculated by using the following Equations 7 and 8.

$$\Delta B4 = Sv \cdot t3 \quad \text{[Equation 7]}$$

$$\Delta R = Sv \cdot T \quad \text{[Equation 8]}$$

When the speed of the subject is fast, the following Equation may be used. When a front-side focus distance of a photographing lens of a camera is f, a rear-side focus distance of the photographing lens is f′, a distance from the front-side focus distance to the subject is d, a distance from the rear-side focus distance of the photographing lens to a photographing face of the photographing lens is z, and a photographing face distance when the subject moves toward the camera at a constant speed is Z(t), Z(t) may be defined by using the following Equation 9.

$$Z(t) = \frac{ff'}{d - \frac{dz}{dt}t} \quad \text{[Equation 9]}$$

Also, Z(t) is approximated as a quadratic function by using the following Equation 10.

$$Z(t) = At^2 + Bt + C \quad \text{[Equation 10]}$$

The moving object prediction AF operation at a release time may be performed by using a time tx from a time t to a point of time at which following focus evaluation values are obtained and a release time lag T.

Figure 11:
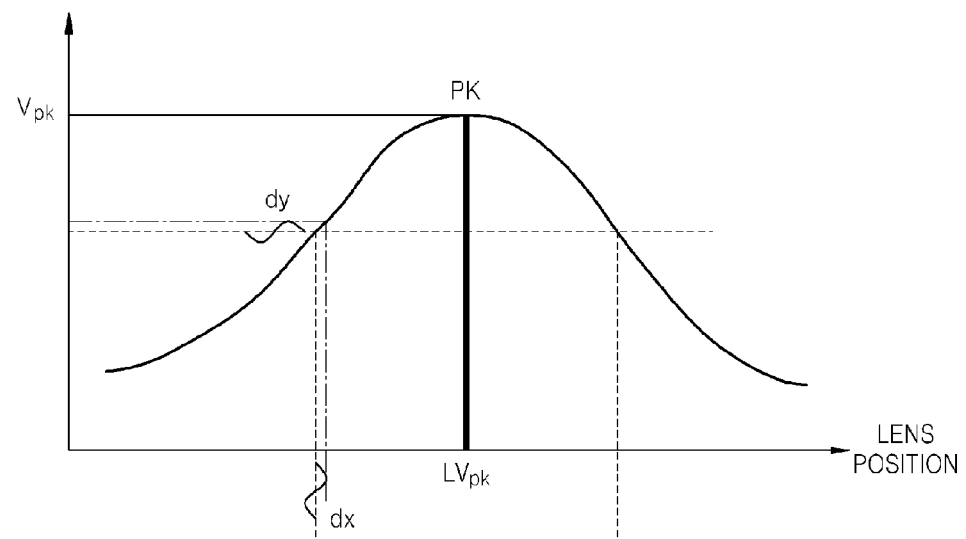
FIG. 11 illustrates a graph for explaining an operation of detecting a moving object by using contrast AF, according to another embodiment.

FIG. 11 illustrates a graph for explaining an operation of detecting a moving object by using contrast AF, according to another embodiment. As another embodiment for performing moving object detection, there is a method of performing a wobbling operation. The wobbling operation is implemented by performing driving of a focus lens, as illustrated in FIG. 11. A horizontal axis of FIG. 11 represents a focus lens position, and a vertical axis of FIG. 11 represents focus detection evaluation values. $LV_{pk}$ represents a peak position, $V_{pk}$ represents a peak value, and PK represents a peak. Micro-vibrations dx are carried out in a direction corresponding to a lens position. Then, an output change dy due to micro-vibrations occurs in the focus detection evaluation values.

Figure 12:
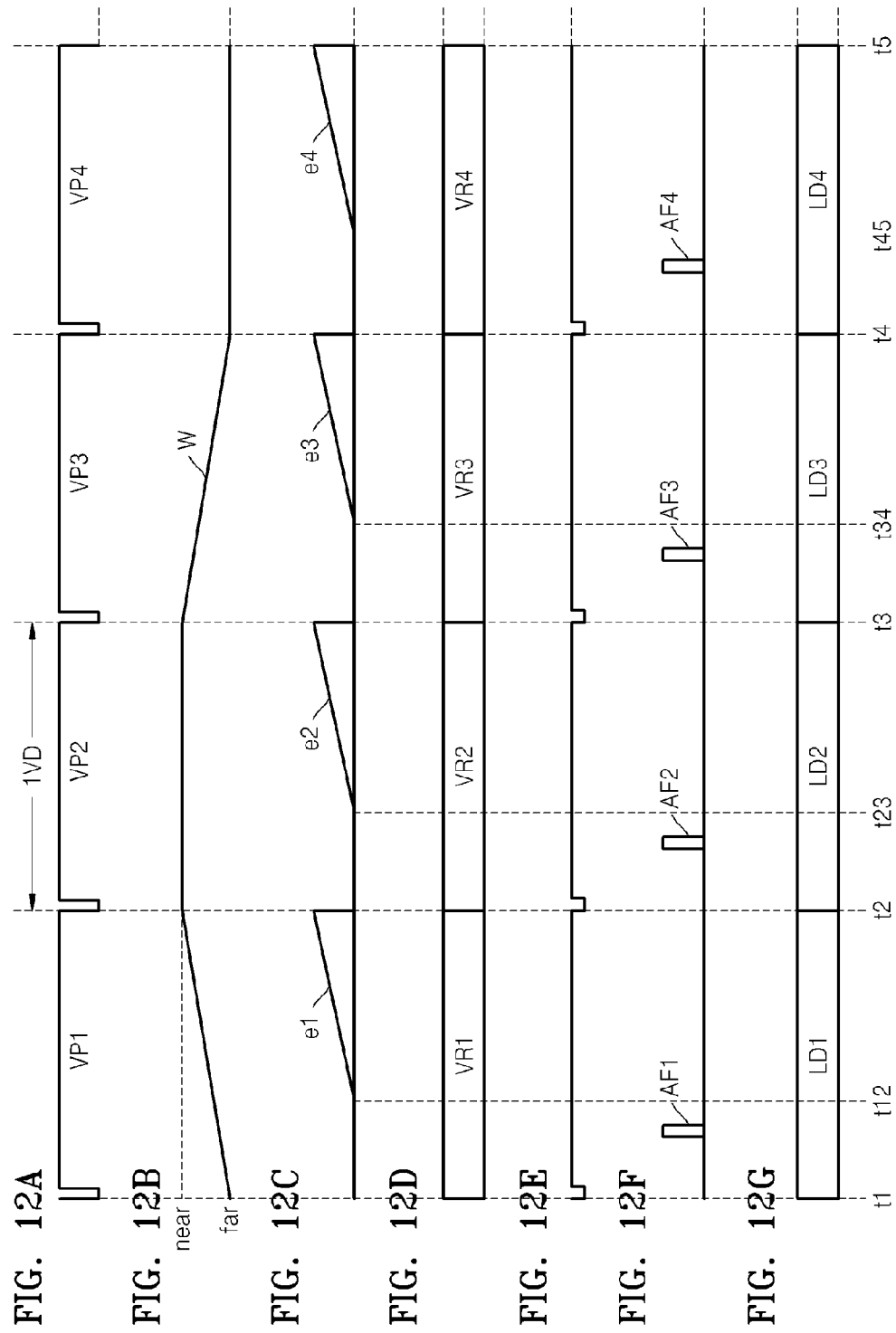
FIG. 12 illustrates a timing diagram of detecting a moving object by using contrast AF according to the embodiment of FIG. 11.

FIG. 12 illustrates a timing diagram of detecting a moving object by using contrast AF according to the embodiment of FIG. 11. An example of time will now be described with reference to FIG. 12. FIG. 12 illustrates a case where a wobbling operation is performed by performing exposure in each of 4 periods 1VD, i.e., one field, one at one time by using a photographing sensor. Here, (a) represents a vertical synchronous signal VD, (b) represents a focus lens position, (c) represents exposure, (d) represents image signal reading, (e) represents a reading time signal, (f) represents calculation of focus detection evaluation values, and (g) represents a lens driving control signal.

First, the focus lens is moved by about 3 Fδ from a far direction to a near direction. Here, F is a number of a photographing lens, δ is a permissible circle of confusion, and Fδ is a focus depth value. Meanwhile, an image signal is obtained. The focus lens stops in a near position, and an image signal is obtained. Also, the focus lens is moved in the far direction and stops in a far position, and an image signal is obtained. This operation is performed in units of 1 VD. An image signal obtained when C-driving is performed has an integration time that changes according to brightness. An image signal obtained by performing e1 is read within a following time VR2 in units of 1 VD. Focus detection evaluation values are obtained at the time AF3. Lens control of LD4 is changed by using a result of the calculation. This operation is the wobbling operation. In this way, AF is performed in a peak position of contrast.

The above-described wobbling operation is performed, and moving object detection as illustrated in FIG. 10 is performed. By performing the wobbling operation, a peak of focus detection evaluation values is found, and a peak position B1 and a peak position B2 are calculated. Compared to operations of FIGS. 4 through 7, directions of the peak positions B1 and B2 may be quickly determined. An operation of detecting a peak position and an operation of detecting a moving object speed are similar to those described with reference to FIGS. 4 through 7.

Hereinafter, a method of controlling a digital camera as a method of controlling an auto-focusing apparatus according to an embodiment will be described with reference to the attached drawings. The following embodiments relate to a digital camera as the auto-focusing apparatus. However, this should not be construed as limiting, and the auto-focusing apparatus may be applied to various types of digital devices such as a mobile phone, a smart phone, a portable multimedia player (PMP), and the like.

Figure 13:
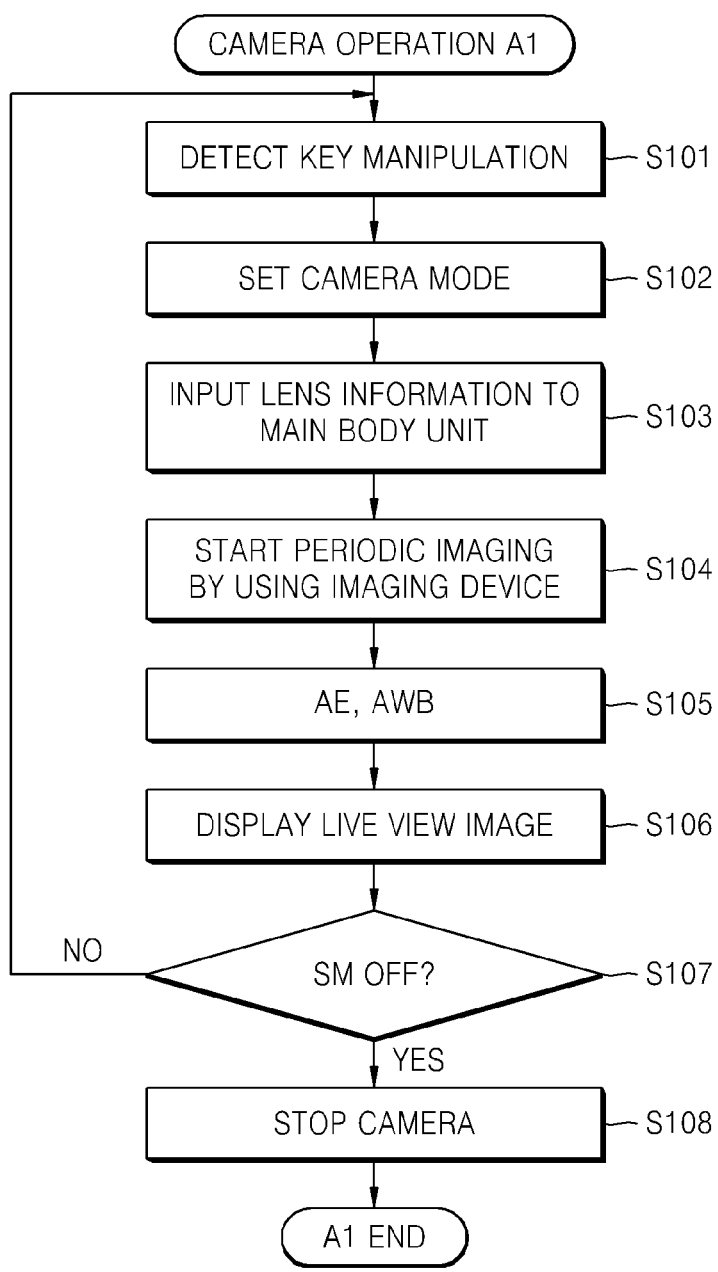
FIGS. 13, 14, 15, 16, 17, 18, 19, and 20 are flowcharts for explaining camera operations, according to various embodiments.

FIG. 13 illustrates a flowchart of operation A1 when a digital camera operates, according to an embodiment. Referring to FIG. 13, a MS of the camera is turned on and the camera operates, and manipulation of a key as a manipulation unit is detected in operation S101. Next, a camera mode is set using a mode dial or menu button of the camera in operation S102. Subsequently, pieces of lens information required for an operation of the camera is input to a main body unit of the camera from an exchangeable lens in operation S103. The pieces of lens information are parameters regarding a lens stored in a memory unit 210 of FIG. 3 within a control circuit (e.g., 110 of FIG. 1) and may include information required for AF, AE, AWB, and image quality control. In an exchangeable lens type camera as illustrated in FIG. 1, lens information is input to the main body unit from the lens in operation S103. However, in a lens integrated camera as illustrated in FIG. 2, set information may be obtained from key manipulation. A switch S1 may be turned on by half-pressing a shutter release button, thereby starting an AF operation.

Periodic imaging of an imaging device starts in operation S104. An AE operation is performed by obtaining light measurement information, and an AWB operation is performed in operation S105. Next, a live view image is displayed in operation S106. Subsequently, it is determined whether the MS is turned off in operation S107. If it is determined that the main switch MS is not turned off, the operation flow proceeds back to operation S101, and operations starting from operation S101 are repeatedly performed. Otherwise, if it is determined that the MS is turned off, the camera stops in operation S108 and operation A1 of the camera is terminated.

Figure 14:
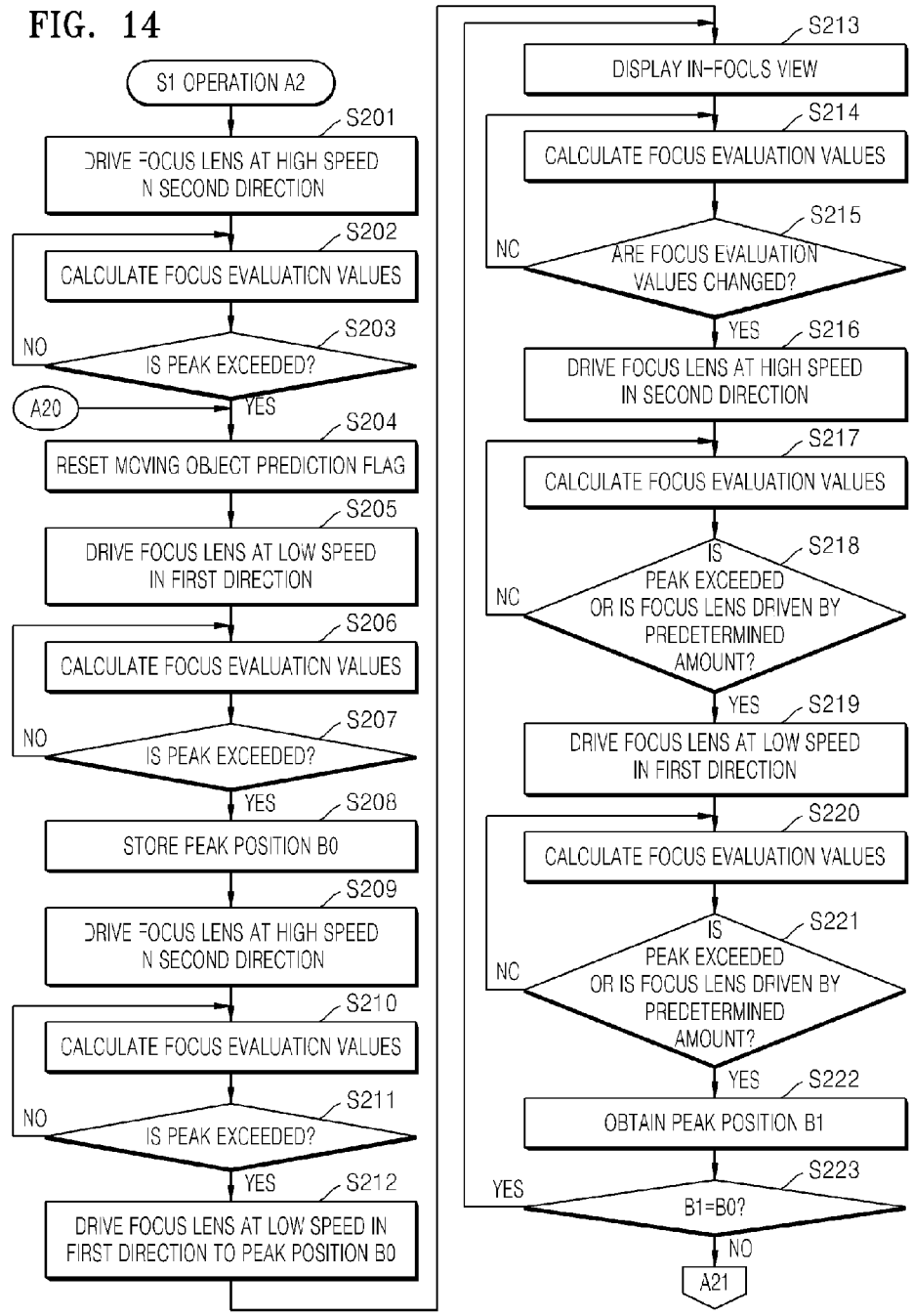

FIG. 14 illustrates a flowchart of S1 operation A2 when a live view image is displayed, the shutter release button is half-pressed and the switch S1 is turned on, according to an embodiment. In S1 operation A2, the AF operation described with reference to FIG. 9 is performed. A focus lens is driven at a constant, relatively high speed in a second direction in operation S201. Next, focus detection evaluation values are calculated by driving the focus lens in operation S202. This corresponds to AF scanning performed by A-driving of FIG. 9. Subsequently, it is determined whether a peak of the focus detection evaluation values is exceeded in operation S203. If it is determined that the peak of the focus evaluation values is not exceeded, the operation flow proceeds back to operation S202, and AF scanning is performed again. Otherwise, if it is determined that the peak of the focus evaluation values is exceeded, the operation flow proceeds to operation S204, and a moving object prediction flag is reset. This corresponds to initial setting of the moving object prediction flag. Next, the focus lens is driven at a constant, relatively low speed in a first direction in operation S205. This is AF scanning corresponding to B-driving of FIG. 9. Next, focus detection evaluation values are calculated in operation S206, and it is determined whether a peak of the focus detection evaluation values is exceeded in operation S207. AF scanning is repeatedly performed until the peak of the focus detection evaluation values is exceeded. Here, a position of the focus lens corresponding to the detected peak is a peak position B0 that is properly focused. The target position B0 is stored in operation S208. Driving control for controlling the focus lens, in which a backlash error does not occur, starts at the peak position B0. The focus lens is driven at a constant, relatively high speed in the second direction in operation S209. Focus detection evaluation values are calculated by driving the focus lens in operation S210. This corresponds to AF scanning performed by C-driving of FIG. 9. AF scanning is performed until the peak of the focus detection evaluation values is exceeded in operation S211. The focus lens is driven at a constant, relatively low speed in the first direction toward the peak position B0 in operation S212. Here, focus detection evaluation values do not need to be calculated. This corresponds to D-driving of FIG. 9. Here, AF is completely performed. Subsequently, an in-focus view is displayed in operation S213. Focus detection evaluation values are calculated in operation S214, and it is determined whether the focus detection evaluation values are changed in operation S215. If the focus detection evaluation values are not changed, the operation flow proceeds back to operation S214, and focus detection evaluation values are repeatedly calculated, and the operation flow waits for a switch S2 to be turned on by fully pressing the shutter release button. If the focus detection evaluation values are changed, it is determined that a subject has changed. In other words, it is determined that there is a possibility that the subject is a moving object.

If the focus detection evaluation values are changed, the focus lens is driven at a constant, relatively low speed in the second direction in operation S216. Focus detection evaluation values are calculated by driving the focus lens in operation S217. It is determined whether a peak of the focus detection evaluation values is exceeded in operation S218. A range for the determination is set. In other words, if there is a peak of the focus detection evaluation values within a predetermined amount of driving, the operation flow proceeds to operation S219, and even when the focus lens is driven by the predetermined amount of driving or more, the operation flow proceeds to operation S219. Driving of the focus lens starts at a constant, relatively low speed in the first direction in operation S219. Focus detection evaluation values are calculated by driving the focus lens in operation S220. It is determined whether a peak of the focus detection evaluation values is exceeded in operation S221. A range of the determination is also set. If there is a peak of the focus detection evaluation values within a predetermined amount of driving, the operation flow proceeds to operation S222, and even when the focus lens is driven by the predetermined amount of driving or more, the operation flow proceeds to operation S222. A peak position B1 is obtained in operation S222. If there is no peak of the focus detection evaluation values within a predetermined amount of driving, the peak position B1 is generally set as 0 in which there is generally no value, or a maximum value. The peak position B1 is compared to the peak position B0 in operation S223. In other words, it is determined whether B1 is equal to B0. If it is determined that B1 is equal to B0, the operation flow proceeds back to operation S213, and processing of an in-focus view is performed. In other words, if the focus detection evaluation values are changed but it is determined that the peak position B1 is equal to the peak position B0, the operation flow proceeds back to operation S213. If the peak position B1 is not equal to the peak position B0, or if there is no peak of the focus detection evaluation values within a predetermined amount of driving, the operation flow proceeds to operation A21.

Figure 15:
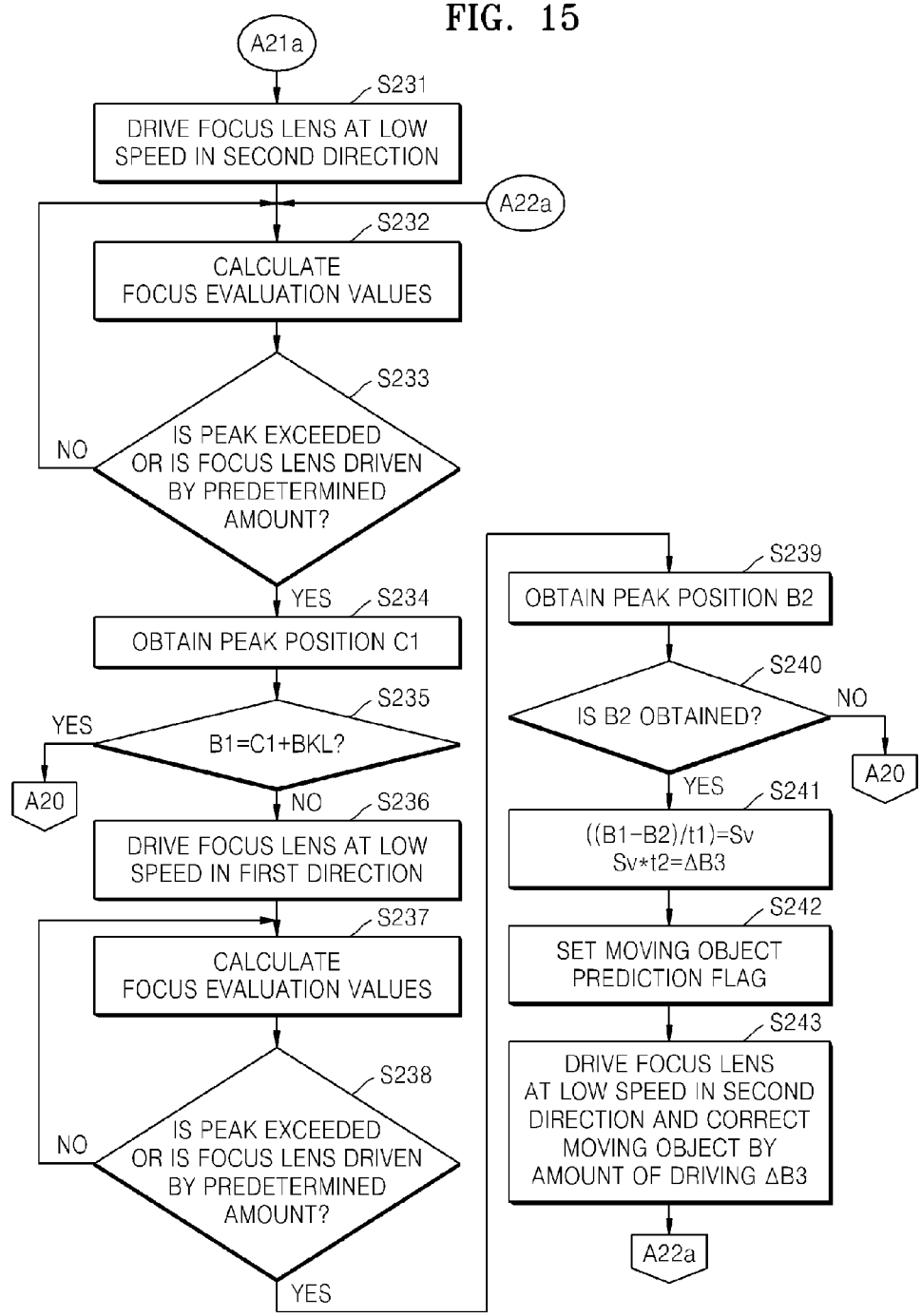

Operation A21a as an example of A21, according to an embodiment, will now be described with reference to FIG. 15. First, the focus lens is driven at a constant, relatively low speed in the second direction in operation S231. Focus detection evaluation values are calculated by driving the focus lens in operation S232. It is determined whether a peak of the focus detection evaluation values is exceeded in operation S233. A range for the determination is set. If there is a peak of the focus detection evaluation values within a predetermined amount of driving, the operation flow proceeds to operation S234, and even when the focus lens is driven by the predetermined amount of driving or more, the operation flow proceeds to operation S234. A peak position C1 of FIG. 10 is obtained in operation S234. It is determined whether B1=C1+BKL in operation S235. In other words, if it is determined that the peak position B1 is equal to a sum of the peak position C and a backlash amount BKL, it is determined that the subject is not a moving object, and the operation flow proceeds back to operation S204 of operation A2 of FIG. 14.

If it is determined that the peak position B1 is not equal to the sum of the peak position C1 and the backlash amount BKL, the focus lens is driven at a constant, relatively low speed in the first direction in operation S236. Focus detection evaluation values are calculated by driving the focus lens in operation S237. It is determined whether a peak of the focus detection evaluation values is exceeded in operation S238. A range for the determination is also set. If there is a peak of the focus detection evaluation values within a predetermined amount of driving, the operation flow proceeds to operation S239, and even when the focus lens is driven by the predetermined amount of driving or more, the operation flow proceeds to operation S239. A peak position B2 of FIG. 10 is obtained in operation S239. If the peak position B2 cannot be obtained in operation S240, it is determined that there is a high possibility that the camera is panned, and the operation flow proceeds back to operation S204 of operation A2 of FIG. 14, and AF scanning is repeatedly performed. If the peak position B2 of FIG. 10 is obtained in operation S240, it is determined that the subject is a moving object, and a moving object speed Sv and an amount of correction ΔB3 for the moving object, respectively, are calculated in operation S241. Sv and ΔB3 are calculated from B1, B2, t1, and t2, as illustrated in FIG. 10. The moving object prediction flag is set in operation S242. The focus lens is driven at a constant, relatively low speed in the second direction by the amount ΔB3 in operation S243. The operation flow proceeds back to operation S232 of operation A21a, and moving object tracking is repeatedly performed.

Figure 16:
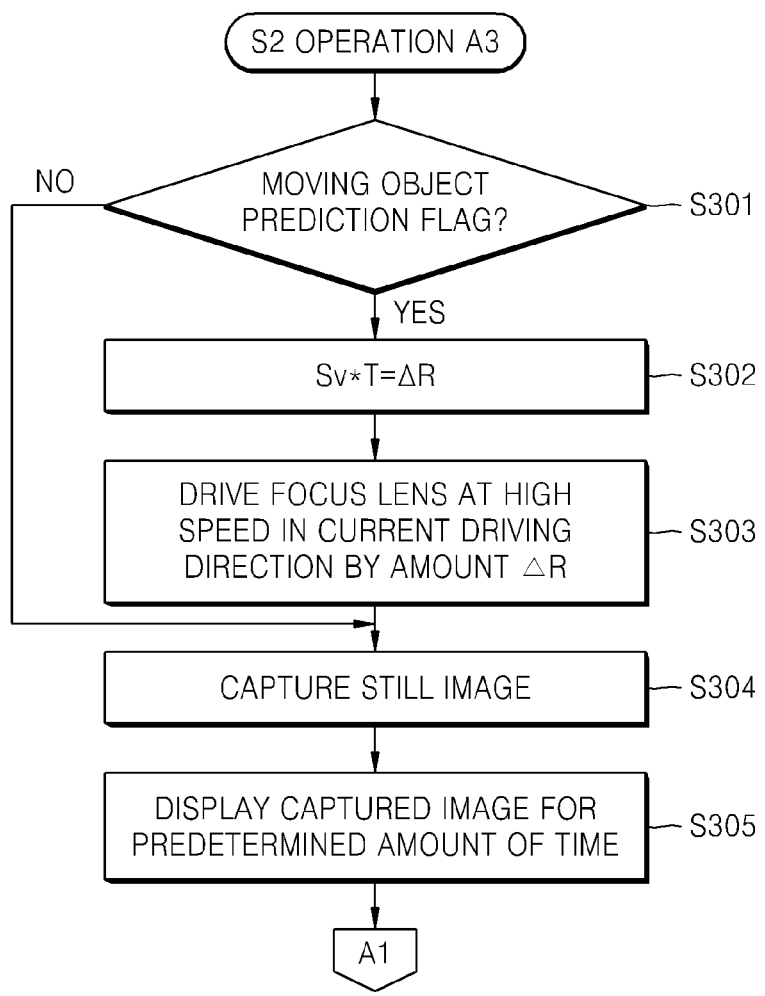

When moving object tracking is repeatedly performed and the switch S2 is turned on by fully pressing the shutter release button, S2 operation A3 of FIG. 16 starts. When the switches S1 and S2 are sequentially turned on from the beginning, S2 operation A3 starts immediately after the camera is initially in an in-focus state. First, it is determined whether the moving object prediction flag is set in operation S301. When the moving object prediction flag is set, the operation flow proceeds to operation S302, and an amount of correction of the moving object during a release time lag T is calculated, as illustrated in FIG. 10. The amount of correction of the moving object is ΔR=Sv·T. The focus lens is driven at a constant, relatively high speed in a current driving direction by the amount ΔR in operation S303. When the moving object prediction flag is not set in operation S301, the operation flow proceeds to operation S304. A still image is captured in operation S304, and the captured still image is displayed for a predetermined amount of time in operation S305. The operation flow proceeds to operation A1 of FIG. 13.

Figure 17:
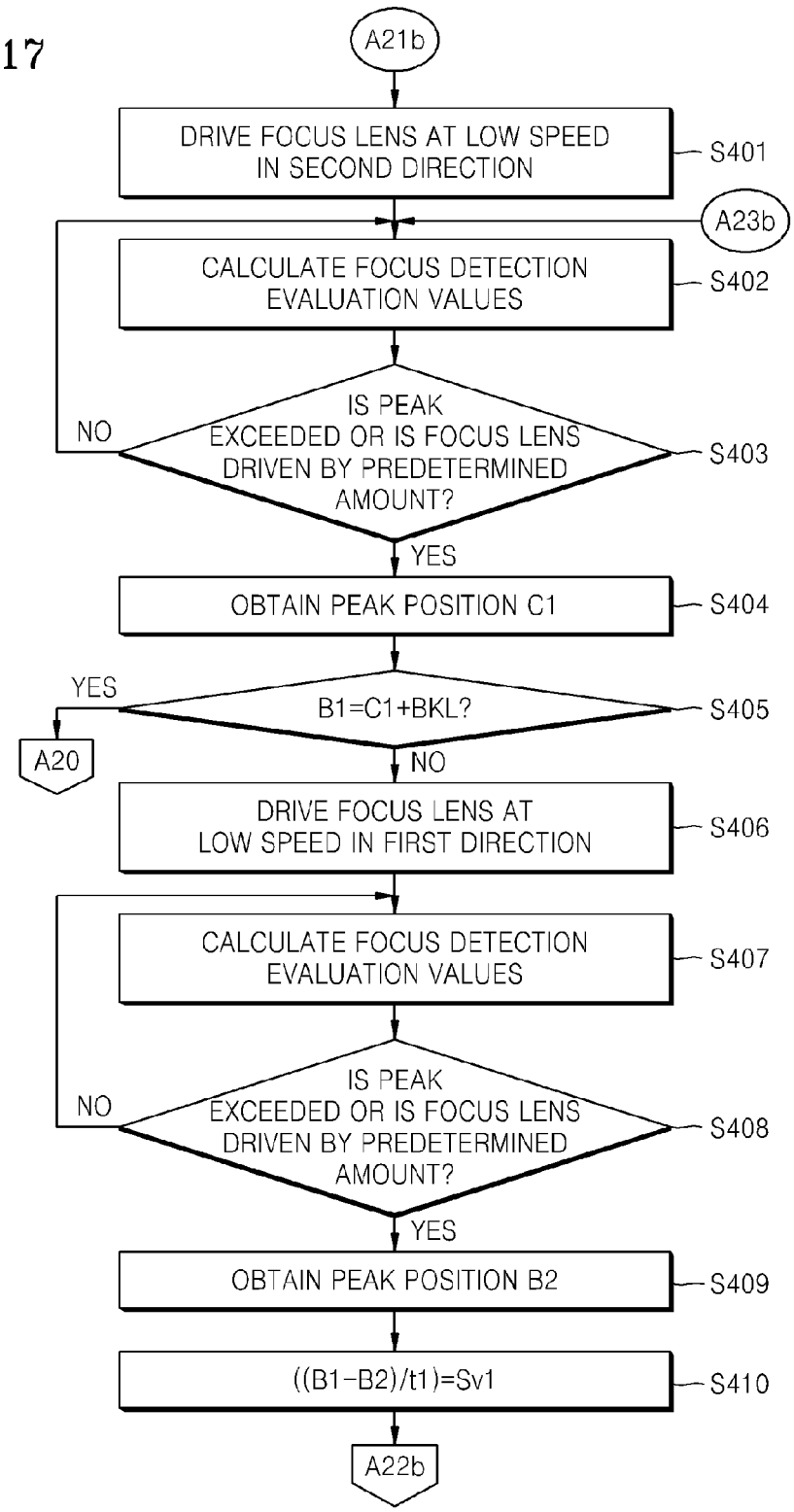
Figure 18:
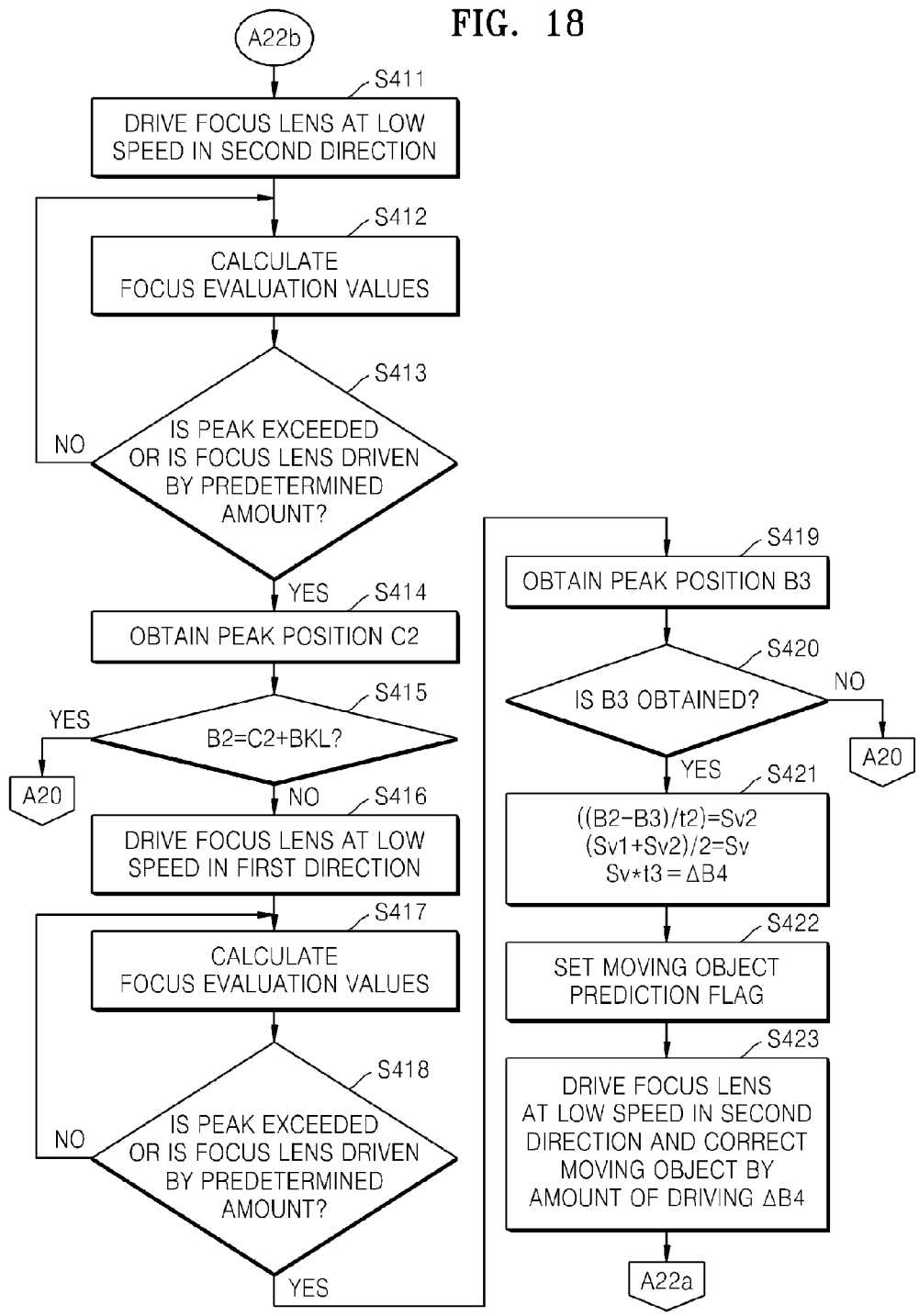

Operation A21b as an example of operation A21, according to another embodiment, will now be described with reference to FIGS. 17 and 18. Here, a moving object speed is calculated using three pieces of information, such as B1, B2, and B3. A difference between FIGS. 17 and 18 and FIG. 15 will now be described. Operations S401 through S409 are the same as operations S231 through S239 of FIG. 15. A moving object speed Sv1 is calculated from B1 and B2 in operation S410. The moving object speed Sv1 corresponds to a speed between B1 and B2 of FIG. 10. Here, Sv1=(B1−B2)/t1. In operations S411 through S419 in FIG. 18, a scanning operation is performed with respect to a peak moved from B2 to B3, and a peak position B3 is obtained in operation S419. Operations S411 through S418 are similar to options S401 through S408, except that peak position C2 is determined instead of C1, and values of C2 and B2 are compared instead of C1 and B1. If the peak position B3 cannot be obtained in operation S420, it is determined that the camera is panned, and the operation flow proceeds back to operation S204 of FIG. 14 (A20), and AF scanning is repeatedly performed. If the peak position B3 is obtained in operation S420, a moving object speed Sv2 between B2 and B3 is calculated in operation S421. The moving object speed Sv2 corresponds to a speed between B2 and B3 of FIG. 10. Here, Sv2=(B2−B3)/t2. The moving object speed Sv is averaged and is calculated as Sv=(Sv1+Sv2)/2. An amount of correction for the moving object is calculated as ΔB4=Sv·t3. Next, the moving object prediction flag is set in operation S422, and the focus lens is driven at a constant, relatively low speed in the second direction in operation S423 by the amount of correction ΔB4 for the moving object. The operation flow proceeds back to operation S402 (A23b) of FIG. 17, and moving object tracking is repeatedly performed.

Figure 19:
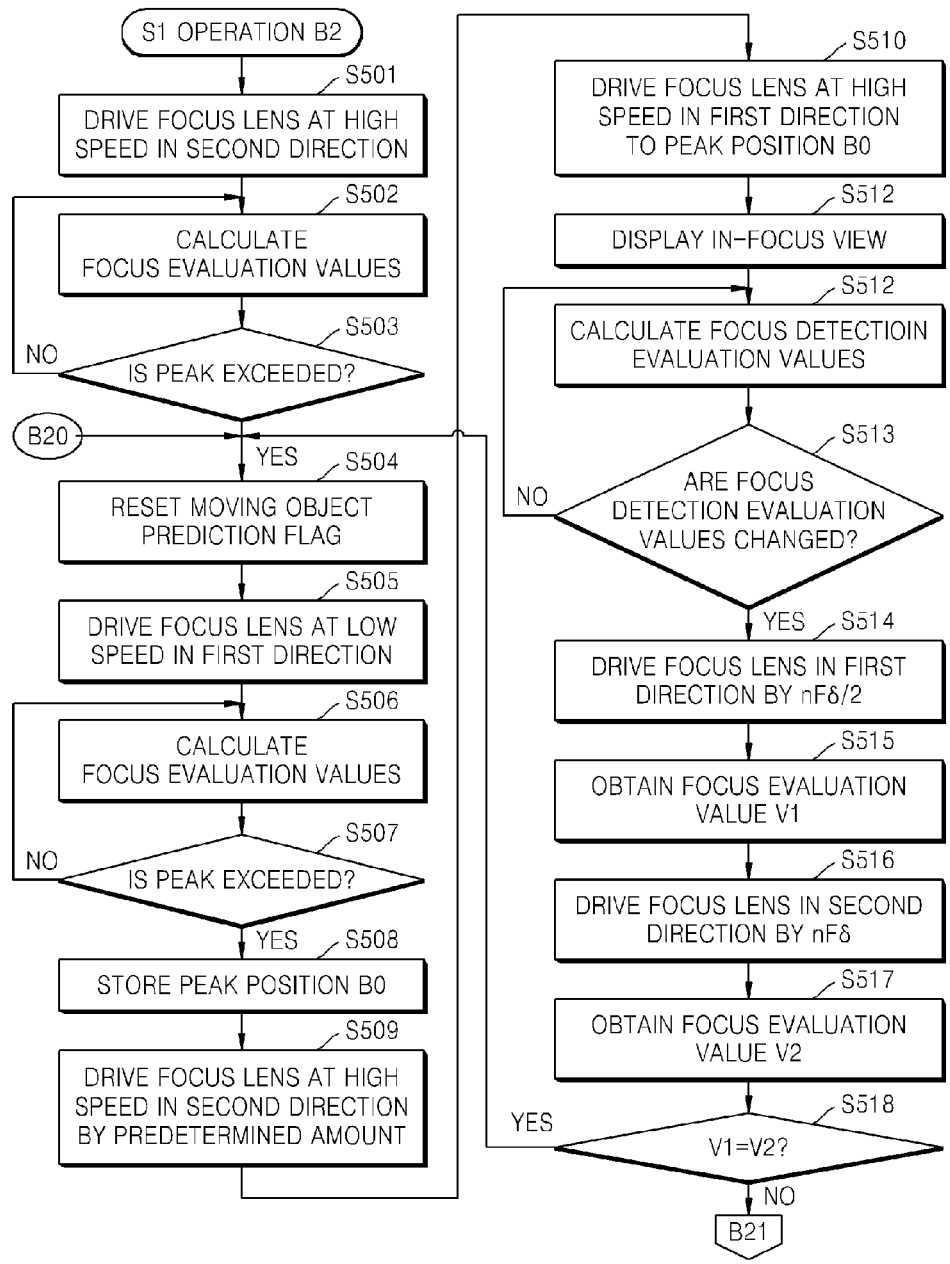

Moving object prediction AF using wobbling, according to another embodiment, will now be described with reference to FIG. 19. First, the focus lens is driven at a constant, relatively low speed in the second direction in operation S501. Focus detection evaluation values are calculated by driving the focus lens in operation S502. It is determined whether a peak of the focus detection evaluation values is exceeded in operation S503. If there is a peak of the focus detection evaluation values within a predetermined amount of driving, the operation flow proceeds to operation S504. The moving object prediction flag is reset in operation S504. The focus lens is driven at a constant, relatively low speed in the first direction in operation S505, and focus detection evaluation values are calculated in operation S506. AF scanning is repeatedly performed until it is determined that the peak of the focus detection evaluation values is exceeded in operation S507. If it is determined that the peak of the focus detection evaluation values is exceeded, a peak position B0 is stored in operation S508. The peak position B0 is an in-focus position. Due to an operation of compensating for backlash, the focus lens is driven at a relatively high speed in the second direction in operation S509, and the focus lens is driven at a relatively high speed in the first direction up to the peak position B0 in operation S510. An in-focus view is displayed in operation S511. Next, focus detection evaluation values are calculated in operation S512, and it is determined whether the focus detection evaluation values are changed in operation S513. If it is determined that the focus detection evaluation values are not changed, the operation flow proceeds back to operation S512, and calculation and determination of the focus detection evaluation values is repeatedly performed. If it is determined that the focus detection evaluation values are changed, the operation flow proceeds to operation S514. The focus lens is driven in the first direction by a minor amount nFδ/2 in operation S514. Here, n is a value between 1 and 3, and F is a value that indicates brightness of a photographing lens, and δ is a depth. A focus detection evaluation value V1 is obtained in operation S515. Next, the focus lens is driven in the second direction by a minor amount nFδ in operation S516. A focus detection evaluation value V2 is obtained in operation S517. It is determined whether V1 is equal to V2 in operation S518. When focus detection evaluation values with respect to the peak position B0 are changed and V1 and V2 before and after the peak position B0, which are repeatedly measured, are the same, it is determined that the subject is not a moving object and the subject is in the same position as the peak position B0, the operation flow proceeds back to operation S504, and AF scanning is performed. If it is determined that V1 is not equal to V2, the operation flow proceeds to operation B21 of FIG. 20.

Figure 20:
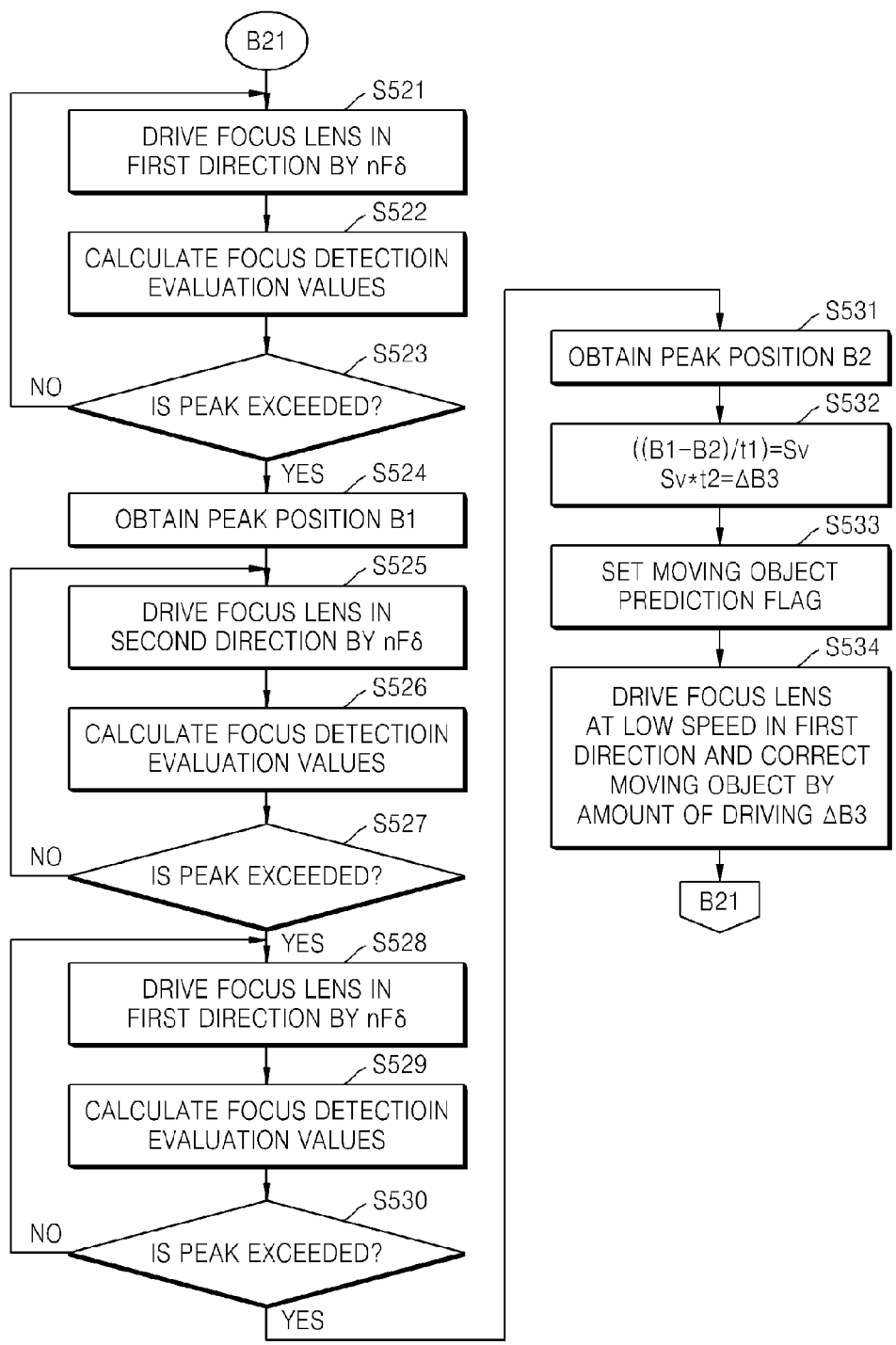

Referring to FIG. 20, the focus lens is driven in the first direction by a minor amount nFδ in operation S521. Focus detection evaluation values are calculated in operation S522. It is determined whether a peak of the focus detection evaluation values is exceeded in operation S523. If it is determined that the peak of the focus detection evaluation values is not exceeded, the operation flow proceeds back to operation S521. If the subject stops, the peak of the focus detection evaluation values is generally exceeded. If it is determined that the peak of the focus detection evaluation values is not exceeded, there is a possibility that the subject is a moving object. If it is determined that the peak of the focus detection evaluation values is exceeded, a peak position B1 is obtained in operation S524. Next, in operations S525, S526, and S527, the above-described operations are performed in the second direction, i.e., a direction opposite to the first direction, and in operations S528, S529, and S530, the above-described operations are performed in the first direction. In operation S531, a peak position B2 is obtained. In operation S532, a moving object speed Sv is calculated as Sv=(B1−B2)/t1, and an amount of correction ΔB3 for the moving object during AF scanning is calculated as $\Delta B3 = Sv \cdot t2$. In operation S533, the moving object prediction flag is set. In operation S534, the focus lens is driven at a relatively low speed in the first direction up to the amount of correction $\Delta B3$ for the moving object, and the operation flow proceeds back to operation S521 of operation B21. In this way, when the switch S2 is turned on by fully pressing the shutter release button during moving object correction AF, S2 operation A3 of FIG. 16 is performed, and correction of the moving object during a release time lag is performed, and a still image is captured.

As described above, in an auto-focusing apparatus according to an embodiment, an image that is properly focused on a subject moving in a direction of an optical axis of a camera can be captured.

In addition, even when backlash exists in auto-focusing control, a speed of a moving object can be accurately detected.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An auto-focusing apparatus comprising:
a focus lens;
a driving unit that drives the focus lens;
an imaging device that receives an optical signal that has passed through the focus lens and generates an image signal;
a focus evaluation value calculating unit that calculates focus evaluation values related to a focus state from the image signal;
a peak position detecting unit that detects a target position of the focus lens corresponding to a peak of the focus evaluation values; and
an operation unit that performs a prediction operation with respect to a moving object by using the peak position obtained by the focus lens in only a first direction,
wherein moving object prediction auto-focusing (AF) is performed by calculating an in-focus position from a speed of the moving object and a time up to an exposure time.

2. The auto-focusing apparatus of claim 1, wherein a moving object prediction position is calculated by using a result of the prediction operation with respect to the moving object, and the focus lens is controlled to the moving object prediction position when the focus lens is driven in the first direction by performing focusing control by driving the focus lens.

3. The auto-focusing apparatus of claim 2, wherein the first direction is a direction in which an error due to backlash is compensated for.

4. The auto-focusing apparatus of claim 1, wherein the first direction is a direction in which an error due to backlash is compensated for.

5. The auto-focusing apparatus of claim 1, wherein the driving unit drives the focus lens in the first direction and a second direction opposite to the first direction.

6. The auto-focusing apparatus of claim 5, wherein the first direction is a direction in which an error due to backlash is compensated for.

7. The auto-focusing apparatus of claim 1, wherein the driving unit drives the focus lens in the first direction and a second direction opposite to the first direction, and the peak position detecting unit detects a peak position in which backlash is compensated for by driving the focus lens in the first direction and the second direction.

8. The auto-focusing apparatus of claim 1, wherein the operation unit calculates a speed of the moving object by using a first peak position in the first direction and a time corresponding to the first peak position, a second peak position in the first direction and a time corresponding to the second peak position, and a third peak position in the first direction and a time corresponding to the third peak position.

9. The auto-focusing apparatus of claim 1, wherein the focus evaluation value calculating unit calculates focus detection evaluation values at least once by driving the focus lens by a predetermined amount during a period of a signal 1VD in the first direction and calculates focus detection evaluation values at least once by driving the focus lens by a predetermined amount during a period of the signal 1VD in a direction opposite to the first direction.

10. The auto-focusing apparatus of claim 9, wherein the predetermined amount is a defocus amount that is greater than a focus depth.

11. The auto-focusing apparatus of claim 1, wherein the focus evaluation value calculating unit calculates focus detection evaluation values by driving the focus lens by a minor amount during a period of a signal 1VD in the first direction and calculates focus detection evaluation values by driving the focus lens by a minor amount during a period of the signal 1VD in a direction opposite to the first direction.

12. The auto-focusing apparatus of claim 11, wherein the minor amount is a defocus amount that corresponds to a focus depth.

13. A method, on an auto-focusing apparatus, the method comprising:
driving a focus lens;
receiving, by an imaging device, an optical signal that has passed through the focus lens and generates an image signal;
calculating focus evaluation values related to a focus state from the image signal;
detecting a target position of the focus lens corresponding to a peak of the focus evaluation values; and
performing a prediction operation with respect to a moving object by using the peak position obtained by the focus lens in only a first direction,
wherein moving object prediction auto-focusing (AF) is performed by calculating an in-focus position from a speed of the moving object and a time up to an exposure time.

14. An auto-focusing apparatus comprising:
a focus lens;
a driving unit that drives the focus lens;
an imaging device that receives an optical signal that has passed through the focus lens and generates an image signal;
a focus evaluation value calculating unit that calculates focus evaluation values related to a focus state from the image signal;
a peak position detecting unit that detects a target position of the focus lens corresponding to a peak of the focus evaluation values; and
an operation unit that performs a prediction operation with respect to a moving object by using the peak position obtained by the focus lens in only a first direction,
wherein the operation unit calculates a speed of the moving object by using a first peak position in the first direction and a second peak position in the first direction, and a time difference between the first peak position and the second peak position.

* * * * *